April 19, 1949.  P. P. TEAL  2,468,002
ACTUATOR MECHANISM

Filed May 27, 1948  2 Sheets-Sheet 1

Inventor:
Percy P. Teal
by his Attorneys
Howson & Howson

April 19, 1949.  P. P. TEAL  2,468,002
ACTUATOR MECHANISM
Filed May 27, 1948  2 Sheets-Sheet 2
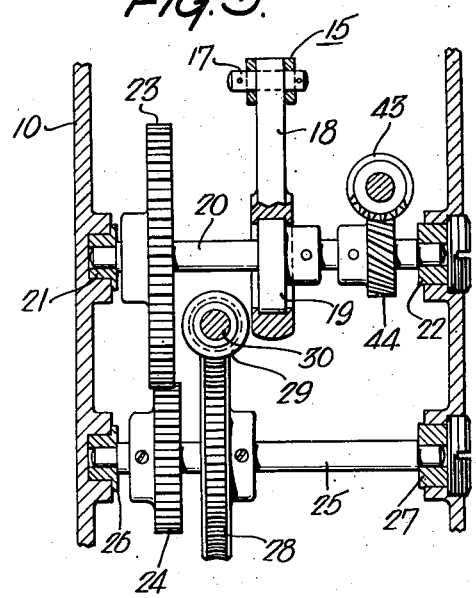
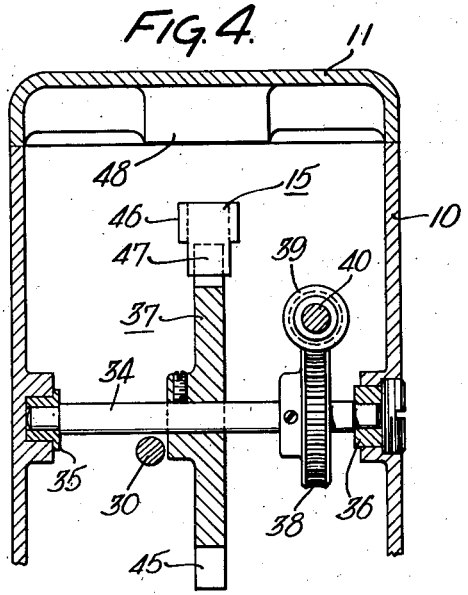
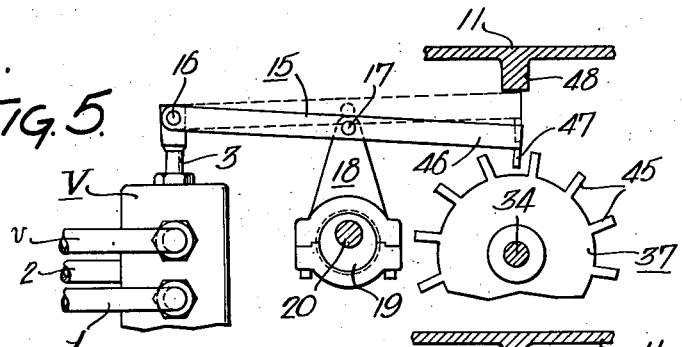
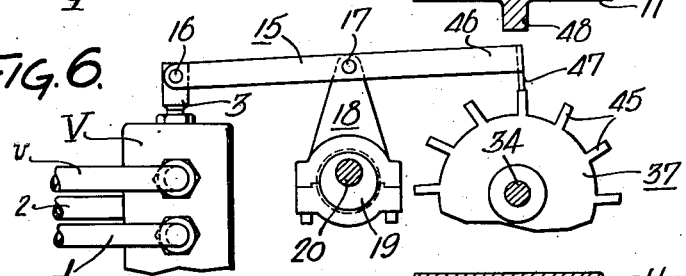
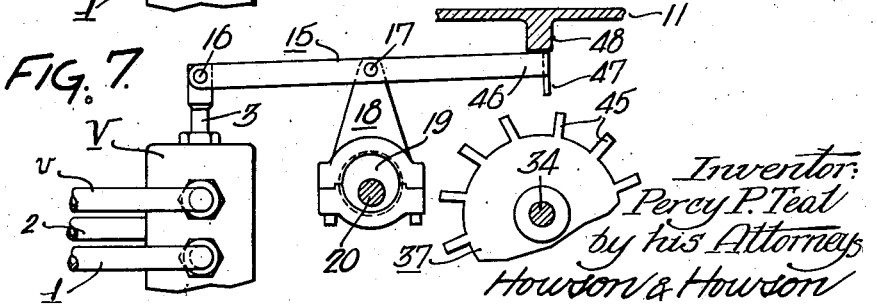
Inventor:
Percy P. Teal
by his Attorneys
Howson & Howson Patented Apr. 19, 1949

2,468,002

UNITED STATES PATENT OFFICE 2,468,002

ACTUATOR MECHANISM

Percy P. Teal, Norristown, Pa.

Application May 27, 1948, Serial No. 29,449

7 Claims. (Cl. 74—40)

This invention relates to new and useful improvements in actuator mechanisms, and more particularly to mechanisms for intermittently actuating devices such as valves in pressure lubricating systems or the like.

The principal object of the present invention is to provide a novel mechanism which is constructed and operable automatically to impart an actuating movement to a member intermittently at predetermined intervals.

Another object of the invention is to provide a mechanism as set forth which embodies novel features of construction and arrangement whereby the time interval between successive intermittent actuations of the member may be controlled and varied as required or desired.

A further object of the invention is to provide novel actuating mechanism having the features and characteristics set forth which is of relatively compact and simplified construction, inexpensive to manufacture, and which is entirely efficient and foolproof in operation and use.

These and other objects of the invention and the various features and details of the construction and operation thereof are hereinafter fully set forth and described with reference to the accompanying drawings, in which:

Fig. 3 is a fragmentary sectional view taken on line 3—3, Fig. 1;

Fig. 4 is a fragmentary sectional view taken on line 4—4, Fig. 1; and

Figs. 5, 6 and 7 are diagrammatic views illustrating the operation of the mechanism.

Figure 1:
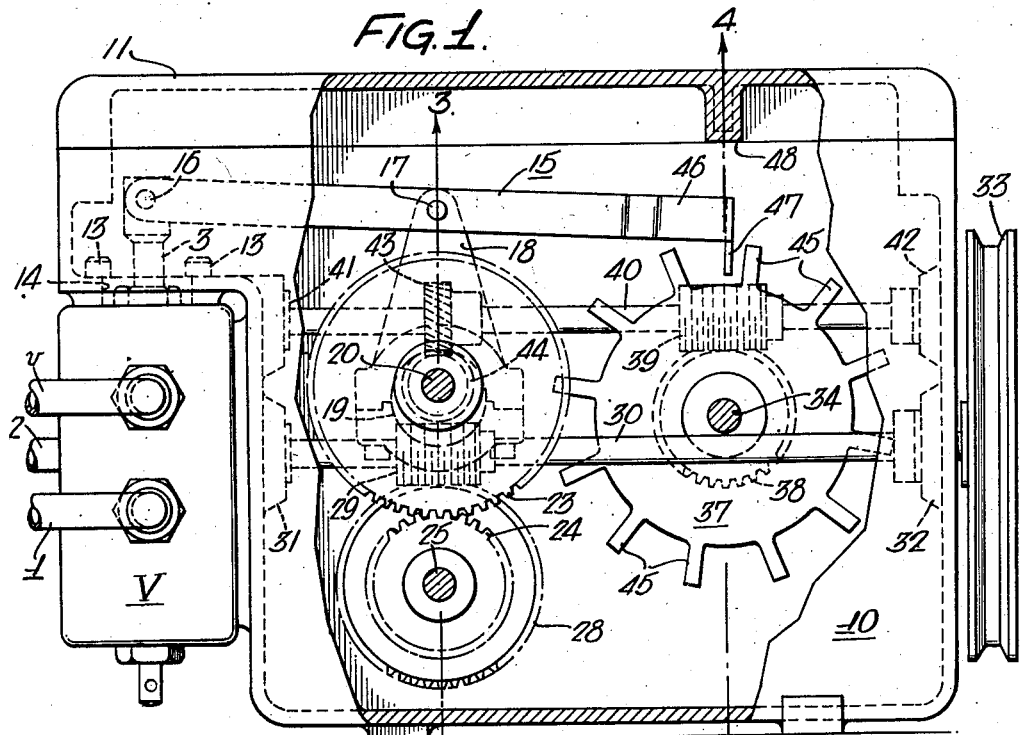
Fig. 1 is a side elevational view of an actuator mechanism made according to the present invention, a portion of the casing having been broken away to illustrate the construction and arrangement of certain internal parts of the device.

Referring now more particularly to the drawing, the actuating mechanism of the present invention is illustrated in conjunction with a conventional control valve V of well-known type commonly used in pressure lubricating systems and having a connection 1 leading to it from a supply of lubricant under pressure, a connection 2 leading from it through which lubricant under pressure is discharged into a lubricating system, and a vent V. The valve is operated by depression of a plunger 3.

Figure 2:
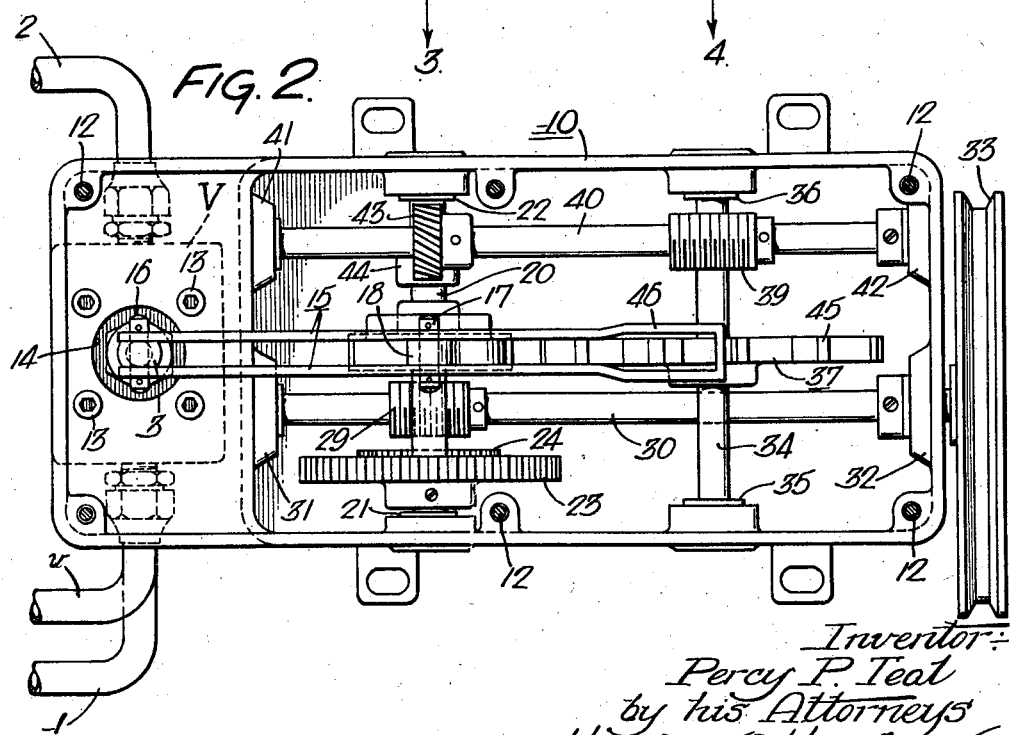
Fig. 2 is a top plan view of the mechanism shown in Fig. 1 with the cover of the casing removed to show the construction and arrangement of parts therein.

An intermittent actuator mechanism made according to the present invention comprises a casing or housing 10 having a top cover member 11 removably secured thereto by bolts or screws 12 (see Fig. 2). In the present instance the casing 10 is constructed to provide a recess at one end thereof for receiving the valve V which is secured to an overhanging portion of the said casing by means of bolts 13. The operating plunger 3 of the valve extends upwardly into the casing 10 through a suitable opening 14 provided in the overhanging portion of the casing above the valve.

In the present instance, intermittent actuation of the valve plunger 3 is effected by a beam or member 15. This beam or member 15 is pivotally connected at one end thereof to the valve plunger 3 by means of a pin 16 and adjacent its midpoint the said beam or member 15 is pivotally connected by a pin or the like 17 to the free end of an arm or member 18. The arm 18 is driven by an eccentric 19 which is mounted upon a shaft 20 that extends crosswise within the casing 10 and has its opposite ends journalled in the opposite side walls of the casing by means of bushings 21 and 22.

The shaft 20 is rotationally driven by means of a spur gear 23 fixed thereon which is in turn driven by a spur gear 24 mounted upon a shaft 25 that is rotatably mounted crosswise within the casing 10 by means of bushings 26 and 27. The shaft 25 is rotationally driven by a worm wheel 28 fixed thereon from a worm 29 which is mounted upon a shaft 30. The shaft 30 extends longitudinally within the casing 10 and has its opposite end portions journalled in the end walls of the casing as indicated at 31 and 32. The end of the shaft 30 remote from the valve V projects entirely through the end wall of the casing, and has secured thereon a pulley or the like 33 which may be rotationally driven, for example, by means of a suitable belt from a motor or other source of rotary power.

Fixed on a shaft 34, which is rotationally mounted crosswise within the casing 10 by bushings 35 and 36, is a fulcrum wheel 37, and this wheel and the shaft 34 are rotationally driven at a given rate of speed with relation to the speed of the arm 18 by a worm wheel 38 that is mounted on said shaft 34 and driven by a worm 39 on a shaft 40. The shaft 40 extends longitudinally of the casing 10 and has its opposite ends journalled in the end walls of the casing 10 as indicated at 41 and 42. The shaft 40 in turn is driven by a spiral gear 43 thereon which is driven from a spiral gear 44 mounted on the first-mentioned shaft 20.

Provided circumferentially of the fulcrum wheel 37 is a series of projections 45 arranged, for example, at equally spaced intervals circumferentially of the wheel. The fulcrum wheel 37 and its projections 45 are disposed directly beneath the free end portion 46 of the beam or member 15 and the projections 45 constitute fulcrum elements which are successively disposed or brought into position beneath the free end portion 46 of the beam or member 15 for engagement by a depending portion 47 thereon, for example, in the manner illustrated in Fig. 6 of the drawings.

Upon vertical reciprocation of the beam or member 15 effected through operation of the eccentrically driven arm 18, the free end portion 46 of the beam likewise will be moved vertically between the fulcrum wheel 37 and an overlying bumper surface 48 provided on the underside of the casing cover 11. Thus, in operation of the mechanism and with the eccentrically driven arm 18 operating at a predetermined speed and the wheel 37 rotating likewise at a predetermined speed, vertical reciprocation of the arm 18 will operate normally to oscillate the beam 15 about its pivot point 17 as shown in Fig. 5 of the drawings and will be ineffective to cause the beam to actuate the plunger 3 of the valve V. However, as the fulcrums 45 on the wheel 37 are disposed successively at predetermined intervals in position to be engaged by the beam portion 47, continued reciprocation of the arm 18 causes the beam 15 to oscillate about the fulcrum as shown in Fig. 6 of the drawings and impart an operating stroke to the valve plunger 3 by depressing the same to cause a charge of lubrication to be discharged from the valve through the aforesaid connection 2 into the lubricating system.

It will be obvious, of course, that the operating speeds of the eccentrically driven arm 18 and the fulcrum wheel 37 will vary according to the particular requirements of the use to which the actuating mechanism is put, and it will be apparent also that by varying the relative operating speeds of the arm 18 and the fulcrum wheel 37, as well as by varying the circumferential spacing of the fulcrums 45 on said wheel, any desired time interval between successive actuations of the valve V or any other device may be provided.

From the foregoing description it will be apparent that the present invention provides an efficient and foolproof mechanism for imparting actuating movements to a selected device intermittently at predetermined intervals which may be readily and easily varied as required or desired. It will be obvious, of course, that use of the mechanism of the present invention is not confined to the actuation of lubricating valves as disclosed herein but may be employed generally in many instances where it is desired to actuate periodically any device or member.

While a particular embodiment of the mechanism has been illustrated and described herein, it is not intended to limit the invention to such disclosure and changes and modifications may be made therein and thereto within the scope of the claims.

I claim:

1. In an intermittent actuator mechanism, a beam having one end thereof adapted to be pivotally connected to a device to be actuated, reciprocating means connected to said beam intermediate its ends and normally operable to oscillate said beam about the pivotal connection of said one end thereof, and a rotary member adjacent the other end of said beam and having fulcrum means positionable successively for engagement by said beam to cause said reciprocating means to oscillate the beam about said fulcrum means and impart an operating stroke to said one end of the beam.

2. In an intermittent actuator mechanism, a beam having one end thereof adapted to be pivotally connected to a device to be actuated, reciprocating means pivotally connected to said beam intermediate its ends and normally operable to oscillate said beam about the pivotal connection of said one end thereof, a rotary member adjacent the other end of said beam and having fulcrum means positionable successively for engagement by said beam to cause said reciprocating means to oscillate the beam about said fulcrum means and impart an operating stroke to said one end of the beam, and mechanism operable to drive said reciprocating means and rotary member in predetermined timed relation to each other and to position said fulcrum means successively for engagement by said other end of the beam at selected time intervals.

3. In an intermittent actuator, mechanism, a beam having one end thereof adapted to be pivotally connected to a device to be actuated, an eccentrically driven arm pivotally connected to said beam intermediate its ends and normally operable to oscillate said beam about the pivotal connection of said one end thereof, fulcrum means adjacent the other end of said beam positionable periodically for engagement thereby to cause the beam to oscillate about said fulcrum means and impart an operating stroke to said one end of the beam, and mechanism operable in timed relation to said arm to periodically position said fulcrum means at predetermined intervals for engagement by said other end of the beam.

4. In an intermittent actuator mechanism, a beam having one end thereof adapted to be pivotally connected to a device to be actuated, an eccentrically driven arm pivotally connected to said beam intermediate its ends and normally operable to oscillate said beam about the pivotal connection of said one end thereof, and a rotary member adjacent the other end of said beam and having fulcrum means positionable successively for engagement by said beam to cause the beam to oscillate about said fulcrum means and impart an operating stroke to said one end of the beam.

5. In an intermittent actuator mechanism, a beam having one end thereof adapted to be pivotally connected to a device to be actuated, an eccentrically driven arm pivotally connected to said beam intermediate its ends and normally operable to oscillate said beam about the pivotal connection of said one end thereof, a rotary member adjacent the other end of said beam and having fulcrum means positionable successively for engagement by said beam to cause the beam to oscillate about said fulcrum means and impart an operating stroke to said one end of the beam, and mechanism operable to drive said arm and rotary member in predetermined timed relation to each other and to position said fulcrum means successively for engagement by said other end of the beam at selected time intervals.

6. In an intermittent actuator member, a casing, a drive shaft rotatably mounted in said casing, a second shaft, means to drive said second shaft from said drive shaft, an eccentric on said second shaft, an arm reciprocable by said eccentric, a beam having one of its ends adapted to be pivotally connected to a device to be actuated and being pivotally connected intermediate its ends to said arm which operates normally to oscillate said beam about the pivotal connection of said one end thereof, a third shaft, means to drive said third shaft in timed relation to said second shaft, a rotary member on said third shaft adjacent the other end of said beam and having fulcrum means positionable successively for engagement by said beam to cause the arm to oscillate said beam about said fulcrum means and impart an operating stroke to said one end of the beam.

7. In an intermittent actuator member, a casing, a drive shaft rotatably mounted in said casing, a second shaft, means to drive said second shaft from said drive shaft, an eccentric on said second shaft, an arm reciprocable by said eccentric, a beam having one of its ends adapted to be pivotally connected to a device to be actuated and being pivotally connected intermediate its ends to said arm which operates normally to oscillate said beam about the pivotal connection of said one end thereof, a third shaft, means to drive said third shaft in timed relation to said second shaft, fulcrum means on said third shaft adjacent the other end of said beam positionable periodically for engagement by said beam to cause the arm to oscillate said beam about said fulcrum means and impart an operating stroke to said one end of the beam.

PERCY P. TEAL.

REFERENCES CITED

The following references are of record in the file of this patent:

UNITED STATES PATENTS

| Number | Name | Date |
| --- | --- | --- |
| 1,030,748 | Ryan | June 25, 1912 |